United States Patent  [11] 3,608,826

[72] Inventor Richard F. Reinke
 P.O. Box 272, Deshler, Nebr. 68340
[21] Appl. No. 792,013
[22] Filed Jan. 17, 1969
[45] Patented Sept. 28, 1971

[54] ELECTRICALLY DRIVEN CIRCULAR IRRIGATION SYSTEM
 18 Claims, 18 Drawing Figs.
[52] U.S. Cl. ..................................... 239/177,
 137/344, 239/236, 285/236
[51] Int. Cl. ..................................... B05b 3/12
[50] Field of Search ........................... 239/177,
 212, 236; 137/344; 285/235, 236

[56] References Cited
UNITED STATES PATENTS

| 3,314,608 | 4/1967 | Curtis et al. | 239/177 |
| 3,318,531 | 5/1967 | Funk | 239/177 X |
| 150,595 | 5/1874 | McKenzie | 239/236 |
| 1,255,777 | 2/1918 | Norton | 239/177 |
| 2,711,615 | 6/1955 | Boice, Jr. | 239/177 |
| 3,095,148 | 6/1963 | Smith | 239/236 X |
| 3,352,493 | 11/1967 | Curtis | 239/177 |
| 3,394,729 | 7/1968 | Bower et al. | 239/212 X |

Primary Examiner—M. Henson Wood, Jr.
Assistant Examiner—Michael Y. Mar
Attorneys—Clarence A. O'Brien and Harvey B. Jacobson ABSTRACT: An elongated boom having a plurality of sprinkler heads mounted thereon with the boom being constructed of a plurality of articulately connected sections supported by electrically driven wheeled assemblies for propelling the boom in a circular path about a central standpipe. The boom is in the form of a truss construction, the articulate connections between the sections of the pipe are disposed interiorly of the flow path and the sections of the boom are retained in alignment in either direction of movement. An end gun is provided and cam operated to irrigate the normally missed corners of a square area and the lugged wheels on the supporting assemblies are timed so that the lugs track thereby providing less disturbance of the ground surface.

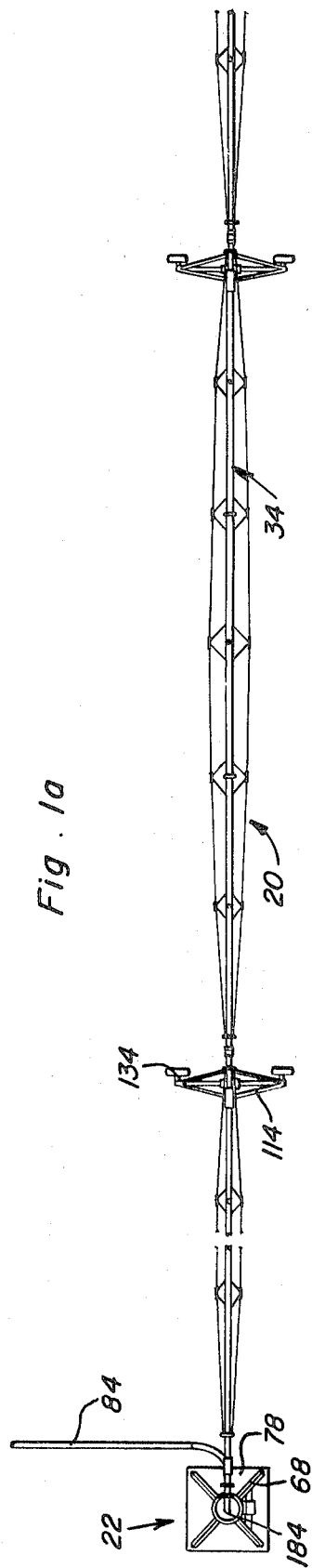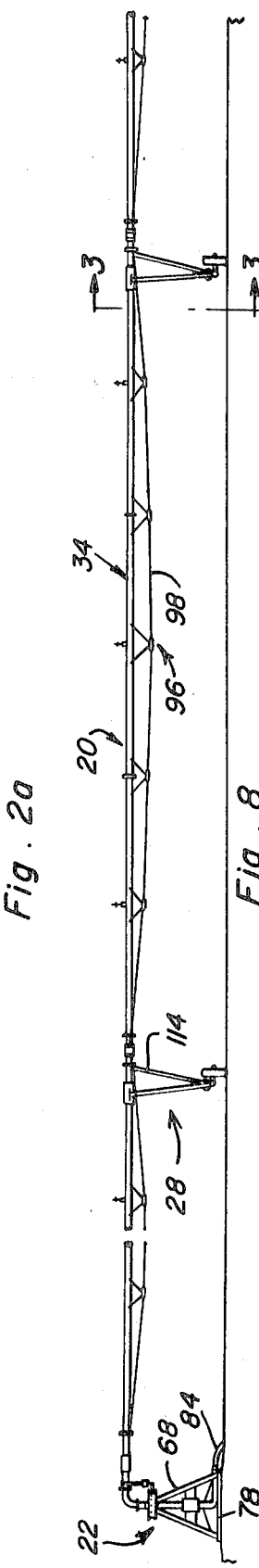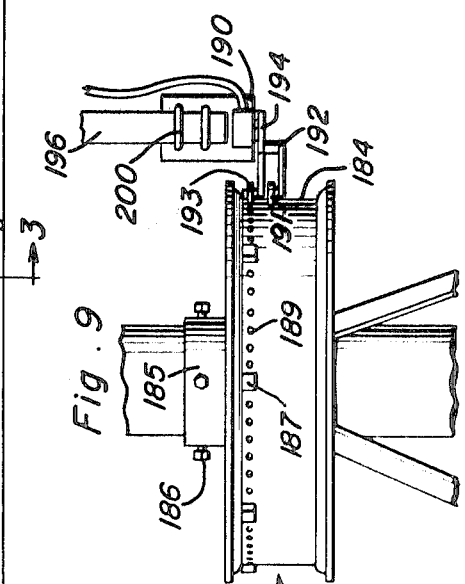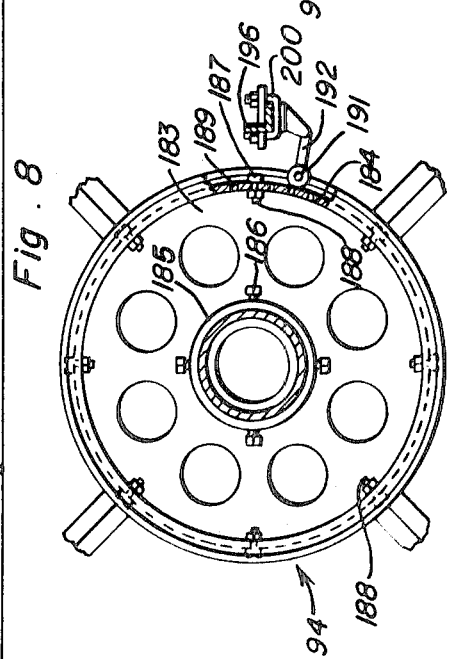

Richard F. Reinke
INVENTOR.

BY Clarence A. O'Brien
and Harvey B. Jacobson
Attorneys

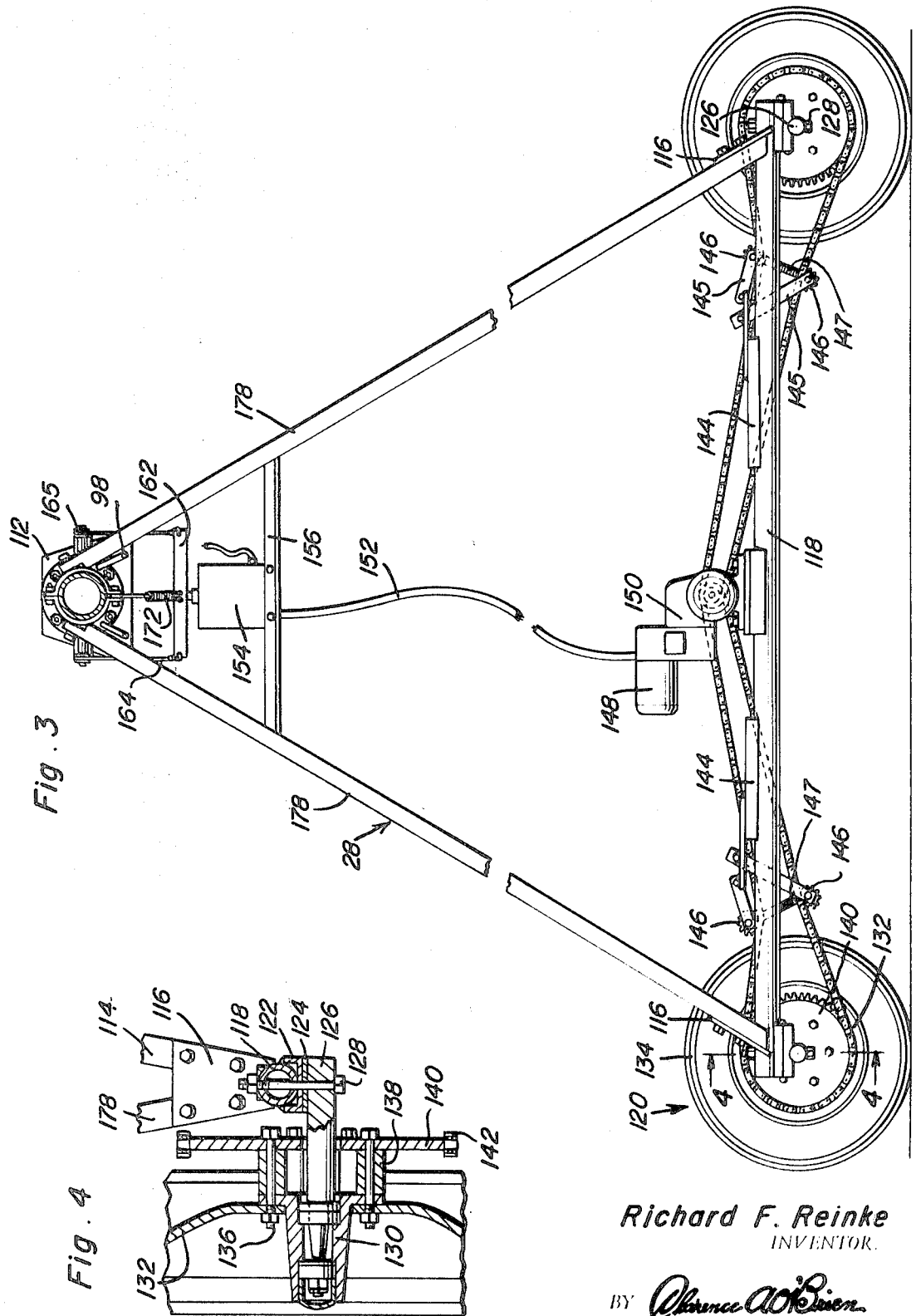

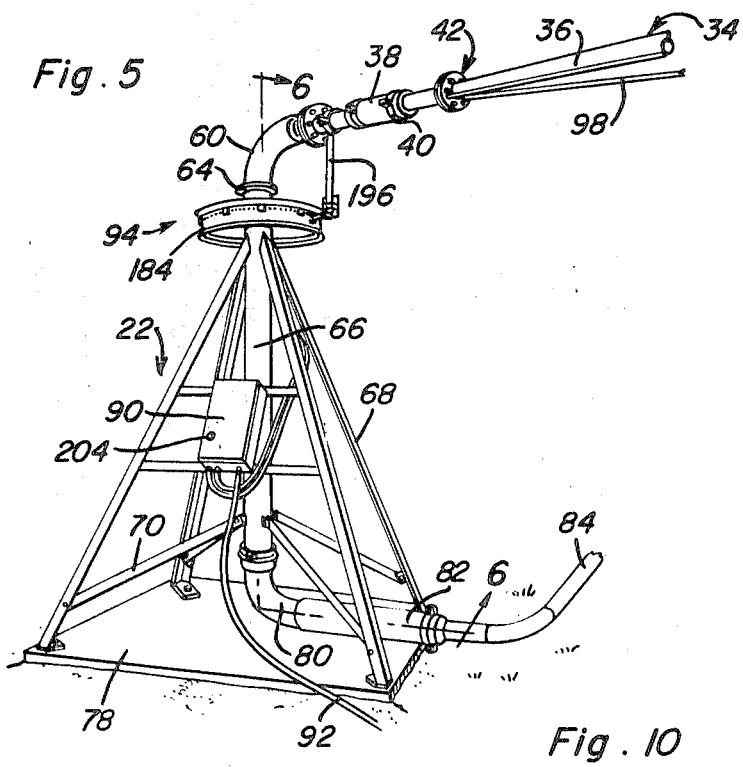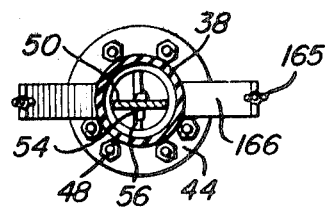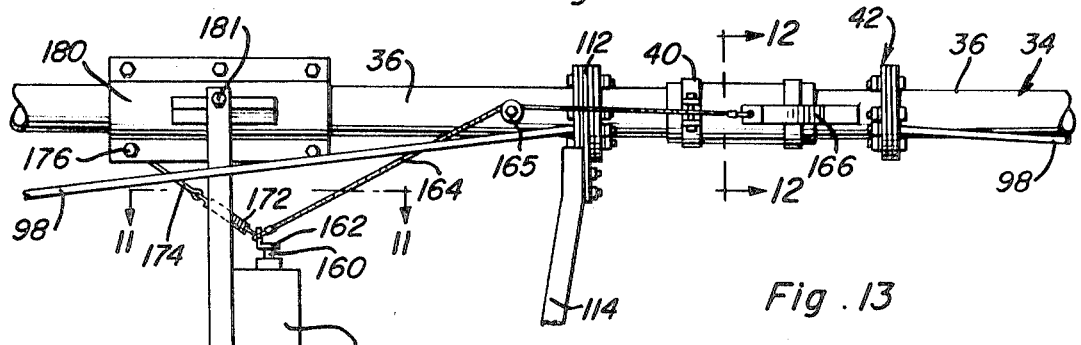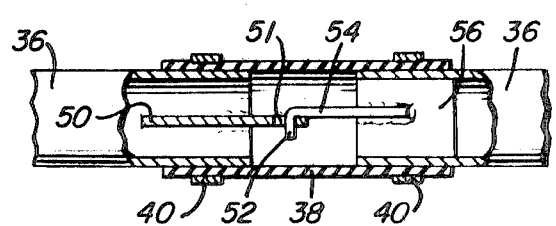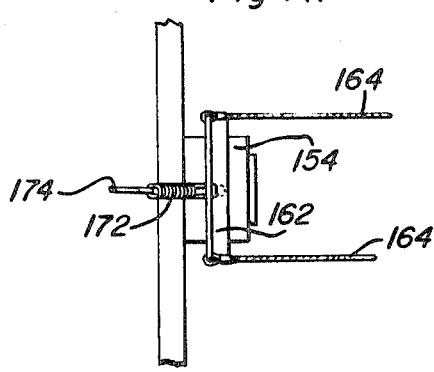

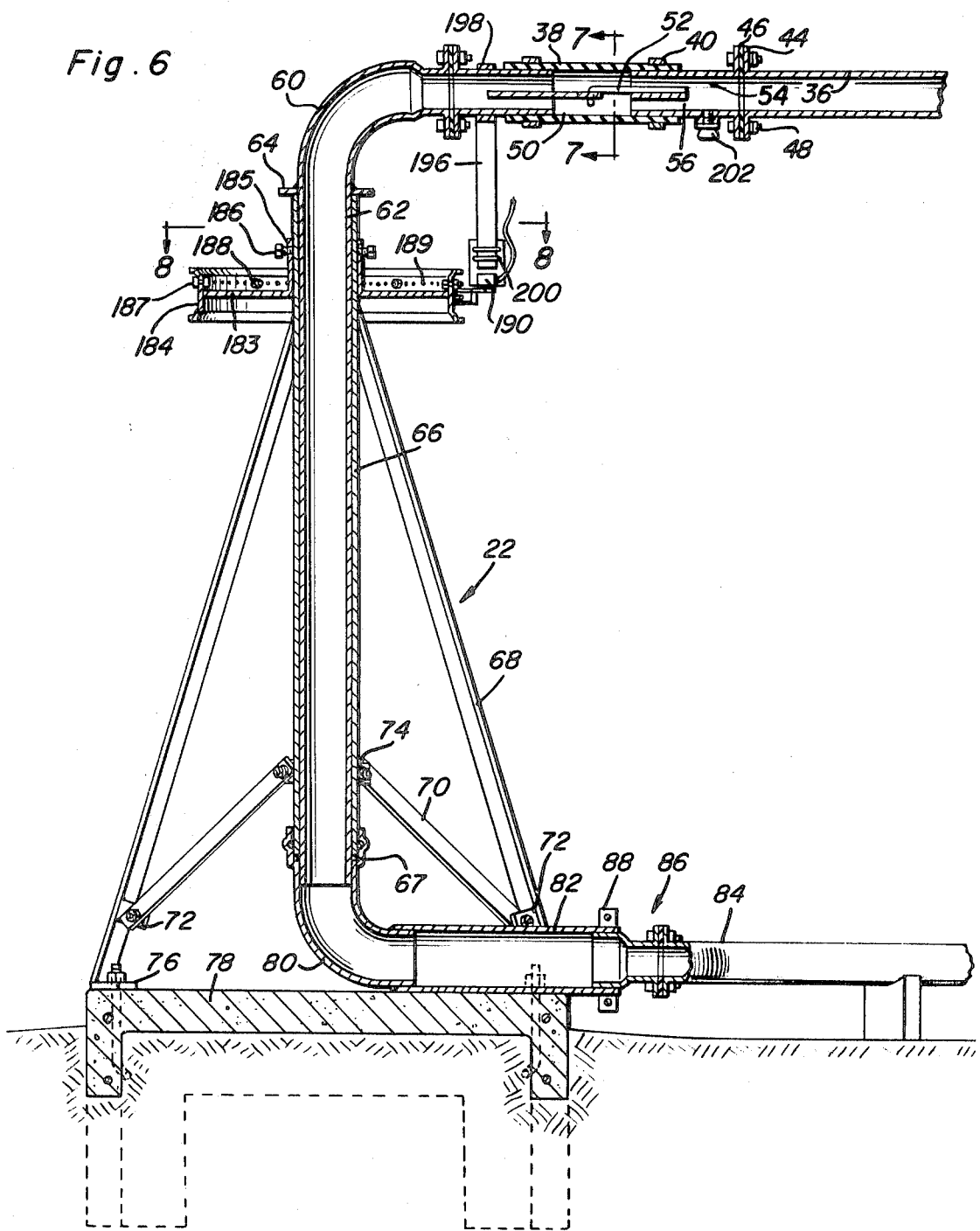
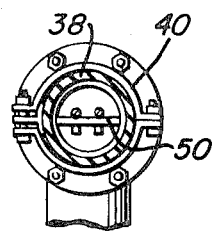

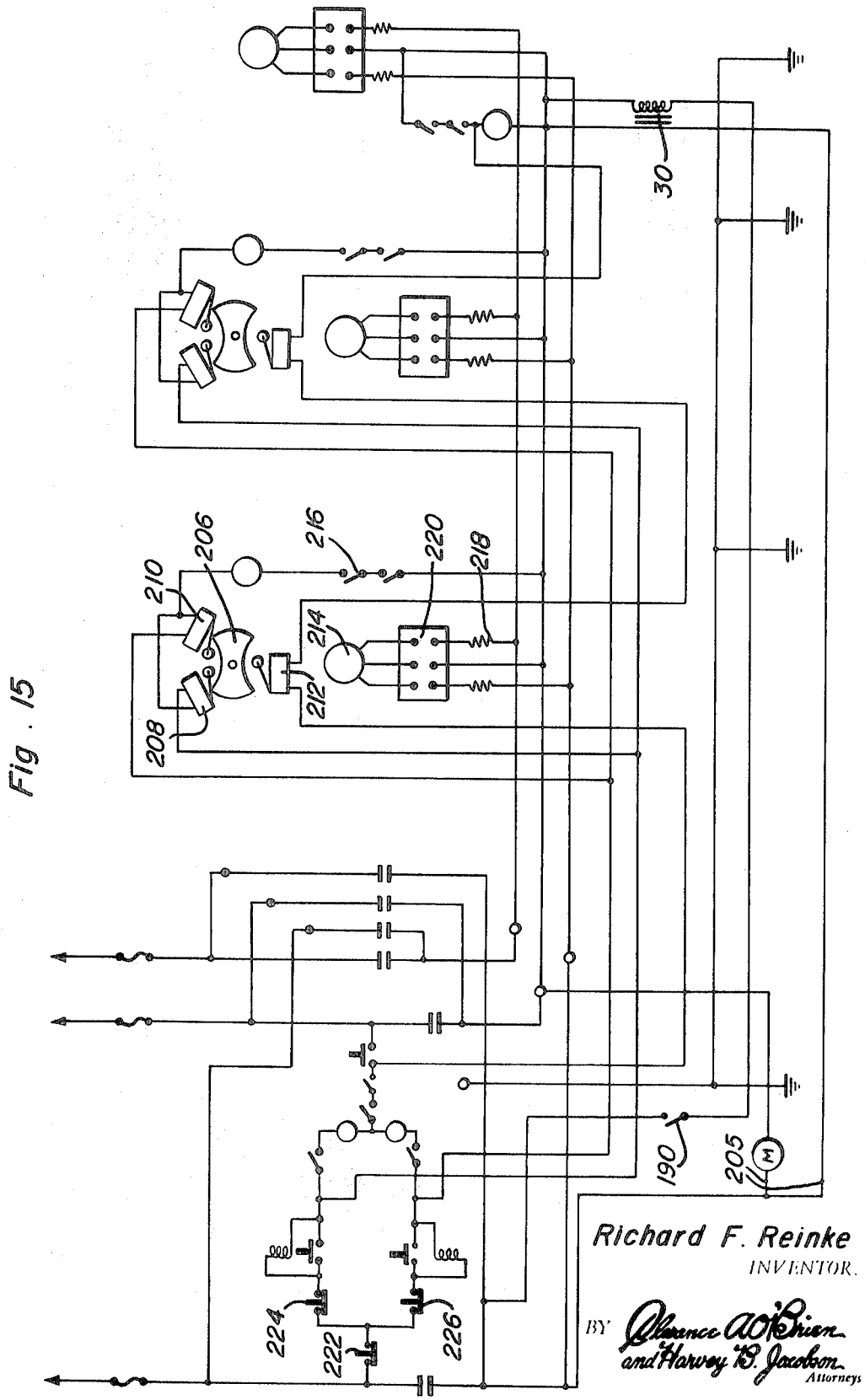

3,608,826

ELECTRICALLY DRIVEN CIRCULAR IRRIGATION SYSTEM

Self-propelled circular irrigating apparatuses are generally known in the industry with one example being illustrated in U.S. Pat. No. 2,604,359, issued July 22, 1952. Such devices include an elongated boom rotatably attached at one end to a supply pipe or standpipe oriented at the center of an area to be irrigated. The boom is supported by a plurality of wheeled supports with means being provided for retaining the boom generally in a straight line condition during rotation thereof. While prior devices in this field of endeavor have been employed, the present invention represents certain novel features which increase the efficiency, reliability and operation of such mechanisms while retaining the initial cost as low as possible and also retaining the cost of operation at a desired minimum.

One object of the present invention is to provide an irrigation system in which an elongated sectional boom is incorporated with the adjacent ends of the sections being connected by a short section of flexible hose with a mechanical hinge connection being provided between the pipe sections defining the boom with the hinge connection being disposed interiorly of the flexible hose within the flow path along the pipe which defines the boom with the pivot connection being centrally disposed within the flexible hose section.

Another object of the present invention is to provide an irrigation system in which the boom is formed by the water pipe and a truss construction in which the pipe forms the top chord of the truss and the bottom or tension chord of the truss is formed by cables or rods connected to the pipe at spaced points by employing V-shaped brace chords of the truss having the apex thereof attached to the tension chord with the tension chord including two spaced tension members in the form of cables or rods with the V-shaped brace chords having their apices spaced further apart than the point of connection with the pipe or upper chord of the truss forming the boom.

A further object of the present invention is to provide an irrigation system including a sectional boom supported by a plurality of electrically driven support assemblies together with a control mechanism for each of the driven supporting assemblies for retaining the sections of the boom substantially in alignment when moving in either a clockwise or counterclockwise direction.

Still another object of the present invention is to provide an irrigation system in accordance with the preceding objects in which a cam-operated end gun is provided at the outer end of the boom for more effectively irrigating the corner areas of a square area being irrigated by the circular irrigation system.

A still further object of the present invention is to provide an irrigation system in accordance with the preceding objects in which each individually driven support assembly includes a pair of lugged wheels which have the lugs thereon timed in relation to each other for assuring tracking thereof to retain ground disturbance at a minimum.

The construction of the irrigation system of the present invention is quite simple in that it includes a substantially less number of parts as compared with presently available structures. The electric drive travels the same speed up hill or down which assures even distribution of water, is reversible merely by the push of a button and is automatic aligning in either direction and the speed can be set to vary the time required for one complete revolution of the boom. The truss being constructed of solid rods provides a rigid construction which will not whip in a gusty wind and the flexible coupling at each support assembly can twist or bend without distortion or undue stress on the machine. The irrigation apparatus can be backed from a struck position with the water off merely by the push of a button and since the drive mechanism is independent of the water supply, any contamination of the water will not affect the drive of the system. Also, the separate electric drive enables the device to effectively operate at various water pressures which may fluctuate for various purposes. Also, the drive mechanism includes a worm gear drive which will prevent the irrigating apparatus from rolling downhill under the influence of gravity inasmuch as the worm gear drive provides a brake therefor thus assuring complete and even distribution of water over the entire area to be irrigated. Also, the truss construction provides a relatively high clearance to enable the boom to clear even tall corn and also sufficient to enable normal farming operations to be conducted under the boom. Weather conditions will not affect the electric drive. Also, the electric drive eliminates the necessity of water to propel the system so that the water can be turned off and the machine propelled and moved around the field thus facilitating manipulation of the irrigation apparatus with or without water pressure therein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGS. 1a and 1b illustrate a top plan view of the irrigation system of the present invention;

FIGS. 2a and 2b illustrate a side elevational view thereof;

FIG. 3 is a vertical sectional view, on an enlarged scale, taken substantially upon a plane passing along section line 3—3 of FIG. 2a illustrating the details of construction of a supporting assembly and the drive mechanism therefor;

FIG. 4 is a detailed sectional view taken substantially upon a plane passing along section line 4—4 illustrating further structural details of the drive mechanism;

FIG. 5 is a perspective view illustrating the construction of the central standpipe, control panel and cam mechanism for the end gun;

FIG. 6 is a vertical, sectional view, on an enlarged scale, taken substantially upon a plane passing along section line 6—6 of FIG. 5 illustrating further structural details of the standpipe;

FIG. 7 is a detailed sectional view taken substantially upon a plane passing along section line 7—7 of FIG. 6 illustrating the construction of the flexible interconnection between the pipe sections as well as the hinged connection therebetween;

FIG. 8 is a detailed sectional view taken substantially upon a plane passing along section line 8—8 of FIG. 6 illustrating the construction of the control cam for the end gun;

FIG. 9 is a side elevational view of the cam structure of FIG. 8;

FIG. 10 is a detailed fragmental side elevational view of one of the flexible connectors for the pipe sections illustrating the apparatus for retaining the sections in alignment;

FIG. 11 is a detailed sectional view taken substantially upon a plane passing along section line 11—11 of FIG. 10 illustrating the structure of the control mechanism attached to the supporting leg structure;

FIG. 12 is a sectional view of the flexible coupling taken along section line 12—12 of FIG. 10.

FIG. 13 is a longitudinal sectional view of the coupling structure illustrated in FIG. 12;

FIG. 15 is a schematic view of the control apparatus; and

Figure 16:
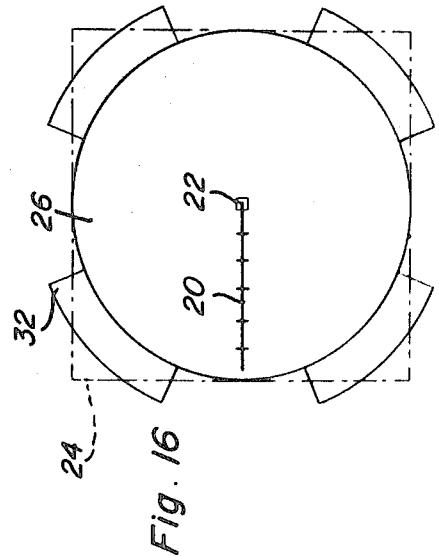
FIG. 16 is a schematic plan view illustrating the manner in which a square or area of land is irrigated employing this invention.

Referring now specifically to the drawings, the irrigation system of the present invention includes an elongated boom generally designated by the reference numeral 20 having one end thereof connected to a stand and standpipe assembly generally designated by the numeral 22 oriented centrally of a square area 24 to be irrigated with the boom 20 moving in a circular path to define a circular area 26. The boom 20 is supported by a plurality of longitudinally spaced wheeled and driven supporting assemblies 28 connected thereto and the end of the boom 20 is provided with an end gun or spray head 30 for irrigating additional areas 32 at the corners of the square area 24 as illustrated in FIG. 16.

The boom 20 includes an elongated pipe 34 which consists of a plurality of aligned pipe sections 36 which are spaced from each other and which are interconnected by a short section of flexible hose or flexible tube 38. The ends of the flexible hose 38 are clamped to the adjacent ends of the pipe sections 36 by conventional clamps 40 in the form of U-shaped members having outwardly extending ears interconnected by clamp bolts. As illustrated, whereas the sections 36 of the pipe 34 are connected, flanged couplings 42 are provided with each of the flanged couplings including an integral flange 44 on each pipe section, a sealing gasket 46 and fastening bolts 48 extending therethrough to provide a flanged coupling between the elongated pipe sections 36 and the relatively short pipe sections 36 having the flexible hose connection 38 therebetween. The present invention also contemplates the use of O-ring gaskets in the pipe flanges 44. One flange of each pair of flanges 44 is provided with one or more grooves partially receiving the O-ring seals or gaskets.

For connecting the pipe sections mechanically, one of the pipe sections is provided with a horizontal diametrically disposed plate 50 secured in the end thereof and projecting axially from the end of one pipe section with an elongated aperture 51 being provided centrally in the free end of the plate 50 for receiving the hook end 52 on the end of a rod 54 attached to a diametric plate 56 rigidly fixed vertically in the end of the adjacent pipe section. The hook end 52 connected with the elongated aperture in plate 50 provides an articulate connection between the pipe sections to enable flexing of one pipe section in relation to the other in both a horizontal and a vertical plane and also provides a flexible coupling for twisting in the event of extremely rugged terrain. The innermost coupling plates 50 and 56 have double apertures and hooks respectively to stabilize the first pipe section 36 (see FIG. 7). As illustrated, all of the couplings except the innermost one are located outboard of the wheeled assemblies 28.

The end of the pipe 34 connected with the stand and standpipe assembly 22 is provided with an elbow 60 terminating in a downwardly extending central pivot pipe 62 having a flange 64 thereon which is rotatably supported on the upper edge of a vertical stationary pipe 66 which encircles the pivot pipe 62 and which extends through the length of vertical stationary pipe 66 and connects 67 with seal at the bottom end thereof to form a rotary seal. The stationary pipe 66 is supported by a plurality of downwardly diverging elongated braces 68 together with a plurality of relatively short braces 70 extending between lugs 72 on the lower portion of the elongated braces 68 and lugs 74 on the stationary pipe 66. The lower ends of the braces 68 have inturned lugs 76 thereon which are supported on a platform such as a concrete deck 78 or the like of any suitable shape and configuration with the braces 68 and 70 and the lugs 76 being secured to their respective attachment points by suitable bolts, fasteners or the like. Thus, the stationary standpipe 66 is held in rigid position while the pivot pipe 62 may rotate about the vertical axis defined by the center of the two concentric pipes 62 and 66.

The lower end of the stationary pipe 66 is provided with a stationary elbow 80 connected at its bottom end to a pipe section 82 connected to a supply pipe 84 through a flanged coupling 86 and a clamp coupling 88 or the like. The supply pipe 84 may extend to a pump with any of the supply piping being underground where it extends beyond the first supporting assembly 28 to eliminate interference between the supply pipe 84 and the supporting assemblies 28 for the boom.

Also mounted on the stand 22 is an electric control panel 90 connected with suitable electrical conductors 92 to feed the control panel and to distribute electrical energy to operate the supporting assemblies and also operate and control the end gun 30. A cam device is also provided on the stationary pipe 66 as designated by the numeral 94 for controlling operation of the end gun 30 in a manner described hereinafter.

Figure 14:
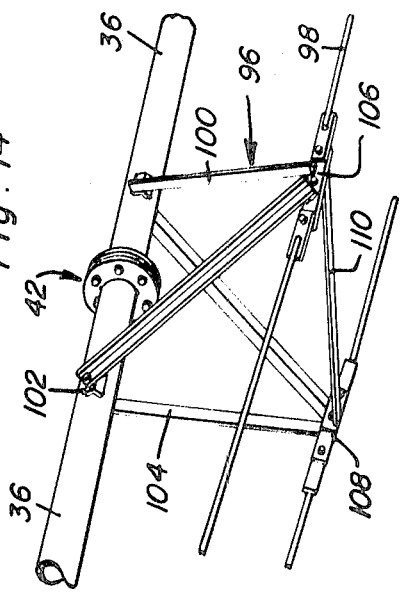
FIG. 14 is an enlarged perspective view of a portion of the boom illustrating the truss construction thereof.

Positioned along the length of the boom 20 for supporting the sections of pipe between the support assemblies 28 is a plurality of truss assemblies generally designated by numeral 96 for association with a pair of tension rods 98 which are disposed in spaced and substantially parallel relation to each other. As illustrated in FIG. 14, the truss assembly 96 includes a pair of downwardly converging braces 100 attached to the pipe sections 36 by fastening lugs 102 in longitudinally spaced relation on the pipe sections. In the event the flanged couplings is positioned adjacent the truss assembly, it is positioned centrally between the braces 100. A similar pair of braces 104 are attached to the opposite surface of the pipe section 36 and the pair of braces 100 diverge downwardly from the pair of braces 104 with the braces 100 and 104 having connector plates 106 and 108 respectively connected to the lower ends thereof thus forming a pair of V-shaped braces rigidly fixed to opposite sides of the pipe section 36 and downwardly diverging. The connector plates 16 and 108 are interconnected by a transversely extending brace member 110 which retains the lower ends of the pairs of braces 100 and 104 in rigid spaced relation. The tension rods 98 are also connected to the brackets 106 and 108 respectively and form the lower chord or tension chord of a truss with the pipe 34 forming the upper chord or compression chord thereof.

Figure 1B:
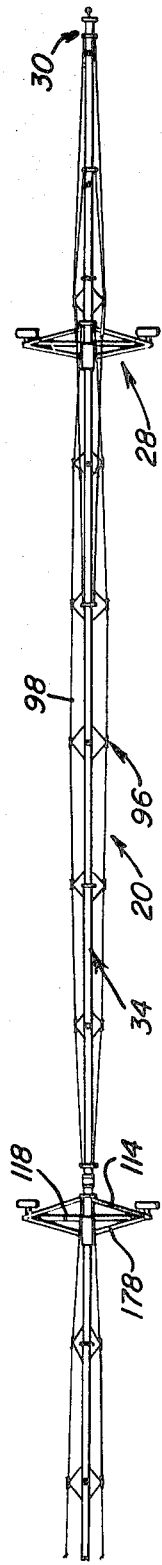
Figure 2B:
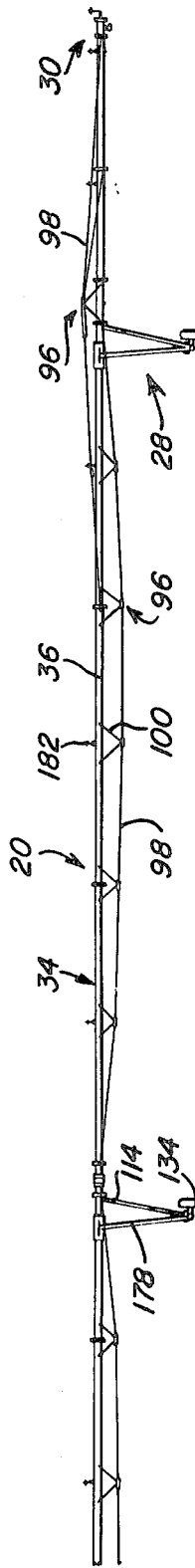

As illustrated in FIG. 2b, the endmost supporting assembly 28 has a truss assembly 96 disposed above the pipe 34 inasmuch as the portion of the pipe 34 outwardly of the outermost support assembly 28 as well as the end gun 30 is cantilevered from the outermost support assembly 28 and thus is supported by the truss assembly and tension rods 98 associated therewith above the pipe 34. All of the other truss assemblies extend between the support assemblies 28 and the ends of the tension rods 98 are connected to a flanged coupling 42 defining the short pipe section in which the flexible hose coupling 38 is incorporated.

Each of the support assemblies 28 includes a supporting plates 112 attached to a coupling member 42 and a pair of downwardly diverging supporting leg members 114 which is slightly angled in relation to the plate 112 as illustrated in FIG. 10. The lower ends of the supporting legs 114 are attached to plates 116 by suitable fastening bolts that are rigidly fixed to the opposite ends of an elongated base member 118 in the form of a pipe or the like to form a base for the supporting assembly or tower. Attached to each end of the tower base 118 is a drive wheel assembly generally designated by the numeral 120. Referring to FIG. 4, the drive wheel assembly includes a channel-shaped plate 122 welded to the lower surface of the outer end portion of the tower base member 118. A similar plate 124 is attached to a spindle member 126 and a bolt 128 extends through the spindle 126, the plates 124 and 122 and the tower base 118 for securing the spindle 126 to the tower base 118. The spindle 126 supports a hub structure 130 of conventional construction which in turn supports a wheel 132 having a pneumatic tire 134 mounted thereon with lug bolts 136 being provided for attaching the wheel 132 to the hub 130 in a conventional manner. The bolts 136 also extend through spacers 138 and correspondingly spaced apertures in a drive sprocket gear 140 which receives a drive sprocket chain 142 around the periphery thereof so that as the drive sprocket chain 142 is moved in a linear manner, the sprocket gear 140 and thus the drive wheel assembly 120 will be rotated in an obvious manner.

Supported on the tower base member 118 are mounting plates 144 each adjustably supporting a pair of idler sprocket gears 146 by the use of pivot arms 145 in a manner to maintain tension on each sprocket chain 142 by engaging the lower and upper runs of the sprocket chains with a tension spring 147 interconnecting the free ends of the arms 145 to urge the gears 146 toward each other. Centrally of the tower base member 118, there is provided an electric drive motor 148 driving a reduction gear unit 150 which has an output sprocket driving the chains 142 so that regardless of the direction of drive of the reversible drive assembly 148 and 150, the sprocket chains 142 will be taut from the drive sprocket to the drive sprocket 140 thus retaining the wheels and tires thereon in a timed relation to assure tracking of the lugs on the wheels. The electric motor 148 is connected with a conductor 152 extending from a control panel 154 supported on brace members 156 which extends between the legs 178 adjacent the upper ends thereof. The upper end of the control box 154 is provided with an actuating shaft 160 projecting upwardly therefrom and terminating in a transversely extending attaching arm 162 which is attached at its center point to the upper end of the actuating rod or shaft 160 so that as the arm 162 is pivoted, it will rotate or oscillate the shaft 160 to operate a control panel in a manner described hereinafter. Flexible tension members such as small aircraft type cables 164 are attached to the remote ends of the arm 162 and extend longitudinally upwardly and over roller wheels 165 fixed in a position coplanar with the horizontal axis of pipe sections 36 between brace supports 114 and 178. The cables 165 are attached to the outer ends of an aligning fork 166 whose ends are perpendicularly positioned in relationship to pivot point of the flexible pipe connection 38 and also located coplanar with the horizontal axis of pipe sections 36. Thus, due to deflection of one pipe section 36 in relation to another about substantially a vertical axis such as when one section of pipe has gained or fallen behind an adjacent section, the fork 166 will be pivoted about generally a vertical axis passing through the center of the pipe section 36 thus tensioning one of the flexible cables 164 and correspondingly pivoting the arm 162 thereby rocking the actuating shaft 160 and operating the control box to energize the motor 148 or vary the speed thereof either by slowing it down or driving it faster so that the adjacent pipe sections 36 will be retained in alignment insofar as the attitude about a vertical axis generally defined by the hook end 52 of the hinge connection is concerned.

As illustrated in FIG. 10, the control panel 154 is hingedly supported at its bottom edge by a hinge device 170 attached to the lower cross brace 156 in any suitable manner so that the upper end of the panel 154 is capable of arcuate swinging movement. This is to enable compensation for changes in the effective length of the cables 164 during twisting of the pipe sections 36 relative to each other about a longitudinal axis. For example, when observing FIG. 10, if the outer pipe section 36 was twisted about the flex coupling due to an outer supporting assembly running over uneven terrain, the fork 166 would twist and both of the cables 164 would be tensioned and would damage either the rollers 165, fork 166, cables 165, arm 162 or the control panel 154 itself. By providing the hinge structure 170, the control panel 154 may pivot outwardly away from the legs 178. To retain the control panel 154 in a normal position, a tension coil spring 172 is attached to the arm 162 centrally thereof and a tension cable 174 is connected to the other end of the spring 172. The opposite end of the tension cable 174 is connected to a fastener 176 which secures a clamp assembly 180 on the pipe section 36. The lower end of legs 178 are attached to the plates 116 and the upper ends adjustably attached to the pipe clamp 180 at 181. Thus, the sections of the pipe defining the boom may proceed over uneven terrain without damage to itself or the control mechanism.

As the boom moves in a circular path, the nozzles or sprinkler heads 182 thereon will effectively irrigate a circular area 26. However, inasmuch as areas to be irrigated are normally laid out in a square configuration, this leaves four corners of a square area with no water applied thereto. The end gun 30 is provided to irrigate areas 32 and the cam structure 94 is provided for controlling the end gun. As shown in FIGS. 6, 8 and 9, the cam structure 94 includes a circular plate 183 having a peripheral vertical flange 184 thereon. Centrally of the plate 183 is an upstanding flange 185 which is attached to the stationary pipe 66 by setscrews 186 which enables the rotational position of the plate 183 and flange 184 to be adjusted about the vertical axis of the stationary pipe 66. Mounted on the flange 184 is a plurality of cam buttons 186 which are adjustably secured in position by fasteners 188 extending through each aperture. The number of cam buttons is determined by the shape of the field with a square field requiring light buttons 188 to effectively irrigate the four corner areas 32 and a triangular field requiring six cam buttons.

A push-on pushoff switch 190 is provided with a gauge roller 191 on an arm 192 and cam contact roller 193 on an arm 194 engaging the cam buttons 187 in order to operate the switch 190 thus operating the end gun 30 electrically by employing the suitable mechanism such as a solenoid control valve or the like on the end gun. As illustrated in FIG. 6, the switch 190 is supported in depending relation from the pipe section 36 by a suitable bracket 196 which is slidably adjustably attached to the pipe section 36 by a sleeve clamp 198 or the like with the switch 190 being adjusted on the bracket by clamp members 200.

In the control panel, there is provided a percentage cycle timer circuit 205 which serves as a speed control on the master motor on the farthest out tower. This type of cycle timer includes several cams and a multicontact switch whereby the circuit can be switched from one contact to another to change the percent of "on" or "off" time of each cycle. Another type of timer which can be employed is also motor driven and includes an adjustment dial which can be turned to indicate how much closed or opened time there is in each cycle. In FIG. 5, reference numeral 204 illustrates an adjustment knob by which the percentage timer may be adjusted.

The electrical control circuit illustrated in FIG. 15 employs standard components as labeled with it being pointed out that the cams in the control boxes on the support assemblies are mounted in the box in a manner to operate the switches with the limit switch being so arranged that in the event the electric motor does not operate for some reason to realign the pipe sections, the cam will actuate the limit switch to render the drive system inoperative in that direction. Even so, the drive structure can then be operated in the reverse direction if desired. A typical cam is designated by numeral 206 with the normally closed reverse control switch designated at 208, the normally closed forward control switch at 210 and the normally closed limit switch at 212 each of which as a follower engaging the cam 206. Each of the motors 214 includes the usual normally closed motor overload switches 216 operated by heaters 218 and motor contractors 220. The control panel at the standpipe is provided with a manual control button 222 for stopping and starting the apparatus and manual buttons 224 and 226 for operating the apparatus in forward or reverse direction. Also, a water drain 202 is provided in the pipe adjacent to each flex coupling to enable water to drain from the pipe when water pressure is relieved thus avoiding the possibility of damage to the system by freezing and also reducing weight of the irrigation system for ease of movement thereof when the irrigation system is driven without it being used to distribute water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. An irrigation apparatus comprising an elongated pipe having a plurality of water discharge means thereon, means supporting one end of the elongated pipe for movement thereof in a circular path for irrigating a circular area, and wheeled means supporting said pipe at longitudinally spaced points along the length thereof, said wheeled means being independently driven for moving the pipe in a circular path about its supported end, said pipe being constructed of a plurality of sections, means articulately connecting the sections together to enable universal angulation of one section of the pipe in relation to another, and means responsive to the angulation of one section of pipe in relation to another to control the speed of each wheeled means to retain the sections of pipe generally in alignment, said means responsive to the angulation of one pipe section in relation to another including means connected with one pipe section and offset laterally from the articulate connecting means and disposed generally in horizontal alignment with the horizontal transverse axis of articulation of the articulate connecting means whereby angulation of adjacent pipe sections about a generally horizontal axis will not alter the speed of the wheeled means.

2. An irrigation apparatus comprising an elongated pipe having a plurality of water discharge means thereon, means supporting one end of the elongated pipe for movement thereof in a circular path for irrigating a circular area, and wheeled means supporting one end of the elongated pipe for movement thereof in length thereof, said wheeled means being independently driven for moving the pipe in a circular path about its supported end, said pipe being constructed of a plurality of sections, means articulately connecting the sections together to enable angulation of one section of the pipe in relation to another, and means responsive to the angulation of one section of pipe in relation to another, to control the speed of each wheeled means to retain the sections of pipe generally in alignment, said means connecting the pipe sections together including a segment of flexible hose flexibly interconnecting the adjacent ends of adjacent pipe sections outboard of the wheeled means, and a mechanical hinge structure disposed interiorly of the flow path defined by the pipe sections and hose and including a universal connection disposed centrally of the flow path and substantially centrally between the adjacent ends of adjacent pipe sections.

3. The structure as defined in claim 2 wherein said means at one end of the pipe to retain it in position includes a stationary upright standpipe connected with a source of water and journaling and communicating with said elongated pipe to supply water thereto.

4. An irrigation apparatus comprising an elongated pipe having a plurality of water discharge means thereon, means supporting one end of the elongated pipe for movement thereof in a circular path for irrigating a circular area, and wheeled means supporting said pipe at longitudinally spaced points along the length thereof, said wheeled means being independently driven for moving the pipe in a circular path about its supported end, said pipe being constructed of a plurality of sections, means articulately connecting the sections together to enable angulation of one section of the pipe in relation to another, and means responsive to the angulation of one section of pipe in relation to another to control the speed of each wheeled means to retain the sections of pipe generally in alignment, said elongated pipe including a truss structure disposed along the undersurface thereof between the wheeled means, said structure including a plurality of pairs of V-shaped braces having the upper ends connected to the pipe in longitudinally spaced relation with the braces in each pair depending downwardly in converging relation to each other and in diverging relation to the braces in an opposed pair, means interconnecting the apices of the pairs of braces to retain them rigidly in spaced-apart relation, and tension rods connected longitudinally of the apices of the braces along each side of the pipe with the ends thereof being connected to the pipe at the end of each section thereof thereby rigidifying and supporting the pipe.

5. The structure as defined in claim 4 together with an end gun at the end of the elongated pipe for irrigating areas exteriorly of the circular area, and means-controlling operation of the end gun for actuating the end gun at the corner areas of a square area thus enabling a larger portion of a square area to be irrigated by the pipe moving in a circular path.

6. The structure as defined in claim 5 wherein said means-controlling operation of the end gun includes a stationary cam mounted at the end of the pipe remote from the end gun for automatically actuating the end gun when the end of the pipe reaches a predetermined point in its circular path of movement.

7. The structure as defined in claim 2 wherein each of said wheeled means includes a pair of wheels oriented in longitudinal alignment, an electric motor driving said wheels, said electric motor being stopped and started in response to alignment conditions between adjacent pipe sections for correcting misalignment thereof.

8. The structure as defined in claim 7 together with limit means for stopping the wheeled means when misalignment between any adjacent pipe sections reaches a predetermined maximum angle thereby stopping the apparatus prior to damage thereto.

9. In an irrigation system of the type having a sectional boom pipe movable over a land area, a articulate connection between adjacent sections of pipe including tubular means flexibly interconnecting adjacent ends of adjacent pipe sections, and mechanical-connecting means disposed in the flow path articulately connecting the pipe sections to enable relative movement therebetweeen in a vertical plane and horizontal plane to enable angulation of adjacent pipe sections in both a vertical and horizontal plane.

10. The structure as defined in claim 9 wherein said mechanical connecting means includes a hook mounted within the flow path and rigid with one pipe section, and apertured means disposed in the flow path and rigid with the other pipe section.

11. In an irrigation system having a boom movable over a relatively large land area and including an elongated pipe receiving water for discharge through a plurality of sprinkler heads, that improvement comprising a supporting truss structure for the pipe including a plurality of longitudinally spaced brace assemblies fixed to said pipe and depending therefrom, each brace assembly including a pair of opposed brace members of V-shaped configuration having the upper ends thereof attached to the pipe and depending in diverging relation, means retaining the lower apices of opposed pairs of brace members in spaced relation, and tension members connected to the pipe at remote points for rigidifying the pipe and forming a truss support therefor.

12. In an irrigation system having a boom movable over a relatively large land area and including an elongated pipe receiving water for discharge through a plurality of sprinkler heads, that improvement comprising said pipe being constructed of a plurality of sections, means articulately connecting the pipe sections together to enable angulation of one section of the pipe in relation to another, wheeled means supporting said pipe sections, said wheeled means being driven for propelling the pipe, and means connected with adjacent pipe sections controlling said wheeled means in response to the angulation of one section of pipe in relation to another to control the speed of the wheeled means to retain the sections of pipe generally in alignment, said means responsive to the angulation of one pipe section in relation to another including means connected with one pipe section and offset laterally from the articulate connecting means and disposed generally in horizontal alignment with the horizontal transverse axis of articulation of the articulate connecting means whereby angulation of adjacent pipe sections about a generally horizontal axis will not alter the speed of the wheeled means.

13. The structure as defined in claim 12 wherein said controlling and offset means includes a fork attached to one pipe section and including free ends spaced from opposite sides of the pipe substantially in horizontal alignment with the horizontal axis of articulation of the articulation means, force transmitting members connected with the free ends of the fork for movement therewith, and a control means mounted on the wheeled means on the adjacent pipe section, the force transmitting means being connected with the control means for operation thereof in response to change angular relation of the adjacent pipe sections only about the vertical axis of articulation of the articulating means.

14. In an irrigation system of the type having a sectional boom pipe movable over a land area, an articulate connection between adjacent sections of the pipe including a tubular member interconnecting adjacent ends of adjacent pipe sections and enabling universal angulation between adjacent pipe sections, and mechanical hinge means articulately connecting the pipe sections to enable relative movement therebetween in a substantially vertical plane and a substantially horizontal plane with the axes of angulation intersecting within the flow path at a point generally located centrally of the tubular member.

15. The structure as defined in claim 12 wherein each wheeled means includes an elongated frame member generally in perpendicular relation to the boom, a wheel journaled at each end of the elongated frame member for engaging the ground surface, and a reversible drive assembly including an electric motor and a reduction gear unit drivingly connected with at least one of said wheels thereby imparting drive force thereto in response to said control means and independent of water flow in the pipe.

16. The structure as defined in claim 15 wherein said wheels on the frame member are positively drivingly interconnected for rotating the wheels in a constant timed relation to assure tracking of lugs provided on the wheels.

17. The structure as defined in claim 13 wherein said force transmitting members are in the form of flexible cables extending longitudinally alongside of the other pipe section and entrained over cable pulleys mounted thereon, said control means mounted on the wheel means including a control box having an actuating arm projecting upwardly therefrom and terminating in a horizontally disposed member with the force transmitting cables being attached to the outer end of the horizontal member for oscillation thereof about substantially a central vertical axis, said control box being mounted adjacent its lower end to the wheeled means for pivoting movement about substantially a transverse, horizontal axis to enable pivotal movement of the control box when both of the cables are effectively shortened in the event of relative twisting movement of the pipe sections about a generally longitudinal axis of the pipe sections whereby relative twisting of the adjacent pipe sections about their longitudinal axis will not vary the speed of the wheeled means, and spring means returning the control box to the normal position when the adjacent pipe sections return to normal position about their longitudinal axis.

18. The structure as defined in claim 12 wherein said articulate connecting means between pipe sections is disposed outwardly of and adjacent to the wheeled means whereby the position of the outer end of an inner pipe section will be controlled by varying the speed of the wheeled means in response to lead or lag of the adjacent outer pipe sections.

UNITED STATES PATENT OFFICE
CERTIFICATE OF CORRECTION

PATENT NO. : 3,608,826
DATED : September 28, 1971
INVENTOR(S) : Richard F. Reinke It is certified that error appears in the above-identified patent and that said Letters Patent are hereby corrected as shown below:

Column 8, line 35, after "connected" insert -- to the apices of said brace member and extending and attached--.

Signed and Sealed this second Day of August 1977

[SEAL]

Attest:

RUTH C. MASON
Attesting Officer

C. MARSHALL DANN
Commissioner of Patents and Trademarks